US007088224B2

(12) United States Patent
Nakagawa et al.

(10) Patent No.: US 7,088,224 B2
(45) Date of Patent: Aug. 8, 2006

(54) AUDIO INFORMATION TRANSMITTING APPARATUS AND THE METHOD THEREOF, AND A VIBRATOR HOLDING STRUCTURE

(75) Inventors: Seiji Nakagawa, Osaka (JP); Masahiko Yamaguchi, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 111 days.

(21) Appl. No.: 10/792,779

(22) Filed: Mar. 5, 2004

(65) Prior Publication Data

US 2004/0183690 A1 Sep. 23, 2004

(30) Foreign Application Priority Data

Mar. 11, 2003 (JP) ............................ 2003-064595
Mar. 11, 2003 (JP) ............................ 2003-064615

(51) Int. Cl.
*H04B 3/36* (2006.01)

(52) U.S. Cl. ............................ 340/407.1; 340/825.19; 340/825.22; 340/825.25; 381/314; 381/315

(58) Field of Classification Search ............ 340/407.1, 340/825.19, 825.22, 825.25, 825.46; 381/23.1, 381/58, 60, 70, 314, 322, 68, 68.4, 120, 315; 434/112, 114, 156
See application file for complete search history.

(56) References Cited

U.S. PATENT DOCUMENTS 5,721,783 A * 2/1998 Anderson .................. 381/328
6,167,138 A * 12/2000 Shennib ...................... 381/60
6,895,345 B1 * 5/2005 Bye et al. .................... 702/57

FOREIGN PATENT DOCUMENTS

EP 0 351 461 A1 1/1990
EP 1 083 769 A1 3/2001
FR 739668 A1 1/1933
GB 743722 1/1946
JP 09-248315 A 9/1997
JP 2001-320799 A1 11/2001
JP 2002-300700 A1 10/2002
WO WO-02/089525 A2 11/1995
WO WO-02/30151 A2 4/2002

OTHER PUBLICATIONS

European Search Report (Jul. 26, 2004).
Sakaguchi et al., "Inner Head Acoustic Field for Bone-Conducted Sound Calculated by Finite-Difference Time-Domain Method", © 2002 The Japan Society of Applied Physics, May 2002, vol. 41, pp. 3604-3608, part 1, No. 5B, Japan.

* cited by examiner

*Primary Examiner*—Hung Nguyen
(74) *Attorney, Agent, or Firm*—Rader, Fishman & Grauer PLLC

(57) ABSTRACT

An audio information transmitting apparatus for transmitting audio information to a human body, comprises an audio signal generating unit in which an audio signal is generated based on inputted audio, an audio information recognizing unit in which the audio signal is recognized as audio information, a vibration signal generating unit in which a vibration signal is generated based on the audio information, a vibration transmitter for transmitting mechanical vibration based on the vibration signal, wherein the vibration signal generating unit modulates a carrier signal having a predetermined frequency based on a predetermined pulse-like pattern corresponding to the audio information so as to generate the vibration signal.

14 Claims, 4 Drawing Sheets

AUDIO INFORMATION TRANSMITTING APPARATUS AND THE METHOD THEREOF, AND A VIBRATOR HOLDING STRUCTURE

TECHNICAL FILED OF THE INVENTION

The present invention relates to an audio information transmitting apparatus for transmitting audio information to a human body and a method thereof. Also, the present invention relates to a vibrator holding structure used for the audio information transmitting apparatus, and more specifically, to a vibrator supporting structure that holds a vibrator for transmitting audio information to the human body, inside a case of the vibrator holding structure.

DESCRIPTION OF RELATED ART

A hearing-aid for a hearing-impaired person is known as this kind of audio information transmitting apparatus. A vibrator for transmitting audio information to a human body is also known. Such a vibrator is used as a hearing-aid for such a hearing-impaired person.

There are two types of hearing aids, that is, an air conduction type of hearing-aids with which vibration of sound is transmitted to cerebral auditory organs through the eardrums, and a bone conduction type hearing-aids with which vibration of sound is directly transmitted from a skull etc. to a human body, without transmitting the vibration of sound through the eardrums, and such a hearing-aid is used by attaching an earphone or vibrator in a predetermined part of a human body.

Recently, a structure capable of transmitting audio information by transmitting ultrasonic vibration to cerebral auditory organs through a vibrator is also known.

In Japanese Laid Open Patent No. 2001-320799, a structure for modulating amplitude of audio signal(s) by DSB (Double Side Band) modulation and transmitting the audio information through an ultrasonic vibrator to a human body is disclosed.

Moreover, in Japanese Laid Open Patent No. 2002-300700, a structure in which frequency multiplication of the low frequency component of a sound signal(s) is carried out so as to transmit it to a human body through an ultrasonic vibrator, is disclosed.

An example of the vibrator holding structure disclosed in Japanese Laid Open Patent No. 2001-320799 is shown in FIG. 5.

As shown in FIG. 5A, a vibrator 50 is accommodated in a case 52 and attached at one end of a spring 54. The other end of the spring 54 is connected to a hemispherical adapter 56 which is slidable along with an inner surface of a base 58. The base 58 can be fixed to an arbitrary position on an inner surface of the case 52 by a slide fixed screw 60. The case 52 is fixed to each end of a spring type head band 62 as shown in FIG. 5B. Each of the vibrators 50 fixed to each case 52 is attached to a predetermined part of a human body by wearing the head set on the head.

According to this vibrator holding structure, while the vibrator 50 is pushed against the human body by a spring 54, the pressing direction of the spring 54 can be changed by sliding of the hemispherical adapter 56.

SUMMARY OF THE INVENTION

However, there is a problem that it is difficult to recognize the audio information due to degradation in transmission efficiency when the earphone or vibrator of the conventional hearing-aid shifts from the attachment position by daily movement or physical exercise etc. of a user.

For example, in the structure shown in Japanese Laid Open Patent Nos. 2002-300700 and 2001-320799, it became clear from inventors' experiments that recognition of audio information becomes very difficult even if the position of the ultrasonic vibrator slightly shifts from the predetermined portion such as a mastoid region.

As described above, when the conventional vibrator holding structure is attached to a portion having a complicated shape surface such as a mastoid region, the direction of vibrator 50 does not follow the shape of the surface, thereby causing displacement between them. For this reason, there is room for further improvement about not only feeling of wearing but also transmission accuracy of audio information and vibration energy transmission efficiency.

Especially, since in the case of the bone conduction type vibrator, the loudness of sound, tone, and pitch, etc. changes a lot merely by slight shift of the position of the attached vibrator 50, the needs of solution to the above-mentioned problem are increasing. Furthermore, since the vibrator 52 is attached by the spring type head band 62, it draws someone's attention, and the improvement of appearance is sought.

This invention is made in view of the problem described above, and an object of the present invention is to provide an audio information transmitting apparatus and the method thereof for easily and certainly transmitting audio information to a user.

The present invention is to provide a vibration holding structure capable of stable transmission of audio information, accomplishing good feeling of wearing and further solving the problem as to cosmetic matters.

The present invention is accomplished by an audio information transmitting apparatus for transmitting audio information to a human body, comprising an audio signal generating unit in which an audio signal is generated based on inputted audio, an audio information recognizing unit in which the audio signal is recognized as audio information, a vibration signal generating unit in which a vibration signal is generated based on the audio information, a vibration transmitter for transmitting mechanical vibration based on the vibration signal, wherein the vibration signal generating unit modulates a carrier signal having a predetermined frequency based on a predetermined pulse-like pattern corresponding to the audio information so as to generate the vibration signal.

Further, according to the present invention, a method for transmitting audio information to a human body, comprised the following steps of: generating an audio signal based on inputted audio; recognizing the audio signal as audio information; and generating a vibration signal based on the audio information. A carrier signal having a predetermined frequency is modulated based on a predetermined pulse-like pattern corresponding the audio signal. The method further comprises a step of transmitting mechanical vibration based on the vibration signal.

Furthermore, according to the present invention, a vibration holding structure for an audio information transmitting apparatus comprises a vibration for transmitting audio information to a human body, a case accommodating the vibrator, and a sucker-like member disposed on an opening of the case. The vibrator is swingably supported by Gimbals mechanism with respect to two axes which are at right angle to each other in the case.

In the vibration holding structure, a connecting hole may be provided on a bottom portion of the case. A pouched body capable of elastic deformation may be disposed on the case so as to connect an inner space of the pouched body to the connecting hole. The vibration holding structure may include a hook-like engaging member disposed elastically and rotatably on the case.

DETAILED DESCRIPTION OF THE INVENTION

Embodiments of the present invention will be described below with reference to the accompanying drawings.

Figure 1:
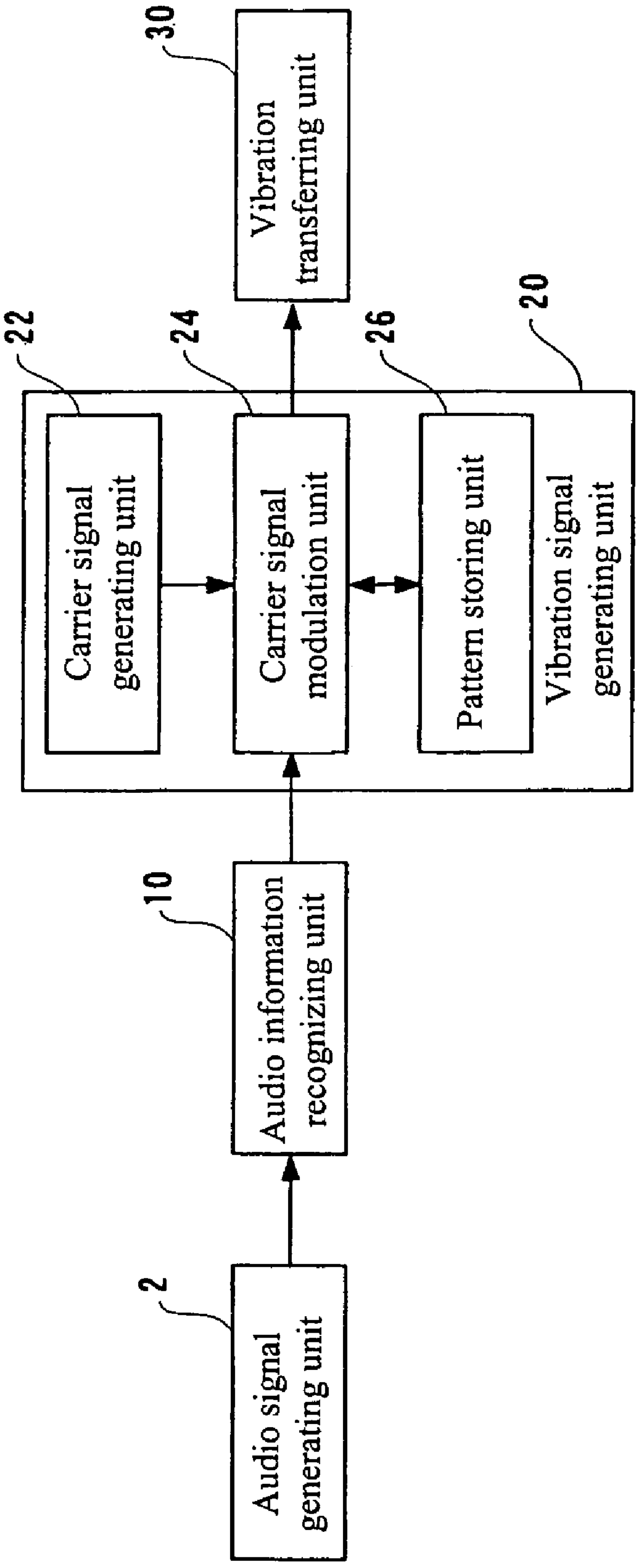
FIG. 1 is a block diagram showing the structure of the audio information transmitting apparatus according to an embodiment of the present invention.

FIG. 1 is a block diagram showing a structure of an audio information transmitting apparatus according to an embodiment of the present invention.

As shown in FIG. 1, the audio information transmitting apparatus has an audio signal generating unit 2 which generates an audio signal(s) based on audio inputted from the outside of the apparatus, an audio information recognizing unit 10 which carries out recognition of the generated audio signal as audio information, an vibration signal generating unit 20 which generates an vibration signal(s) based on the acquired audio information, and a vibration transferring section 30 which transmits mechanical vibration based on the vibration signal.

The audio signal generating unit 2 comprises a microphone, and detects audio from the outside so as to generate an audio signal(s).

The audio information recognizing unit 10 may comprise a well-known speech recognition means. For example, the process the speech recognition is set forth below.

That is, analysis of a spectrum of the inputted audio is carried out by fast Fourier transform etc., and part thereof is extracted as a characteristic time series pattern. The obtained time series pattern is collated with syllable models learned beforehand, and the result of recognition is outputted as audio information. Hidden Markov Model (HMM) etc. is used in the recognition process of the time series pattern.

The vibration signal generating unit 20 is equipped with a carrier signal generating unit 22 which generates a carrier signal(s) having constant amplitude and a frequency, a carrier signal modulation unit 24 which generates a vibration signal(s) by modulating the carrier signal based on the pulse-like pattern corresponding to the audio information, and a pattern storing unit 26 which memorizes a predetermined pulse-like pattern corresponding to each syllable contained in the audio information.

In this embodiment, the pulse-like pattern is set up based on Morse Code, and the pulse-like pattern corresponding to each syllable is beforehand stored in the pattern storing unit 26 with a predetermined combination of a short pulse(s) and a long pulse(s).

Figure 5A:
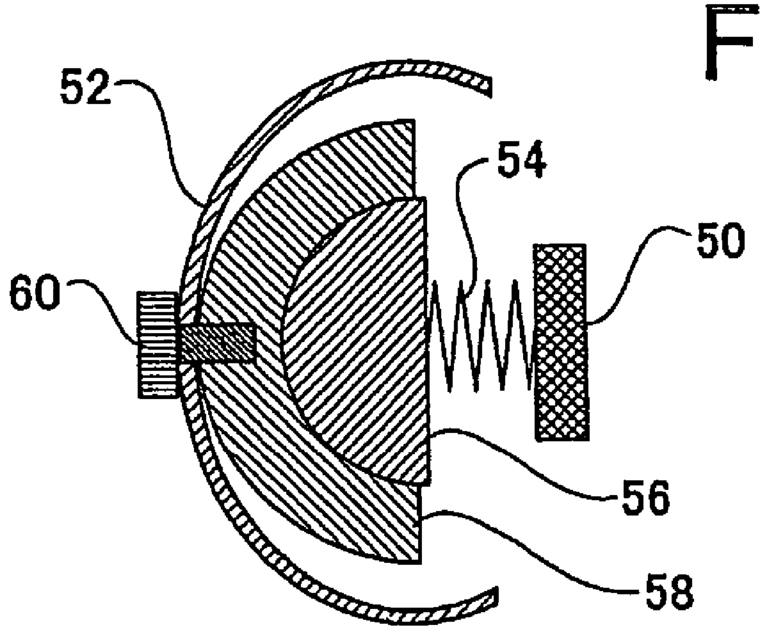
FIG. 5A is a sectional view of a conventional vibration holding structure.
Figure 5B:
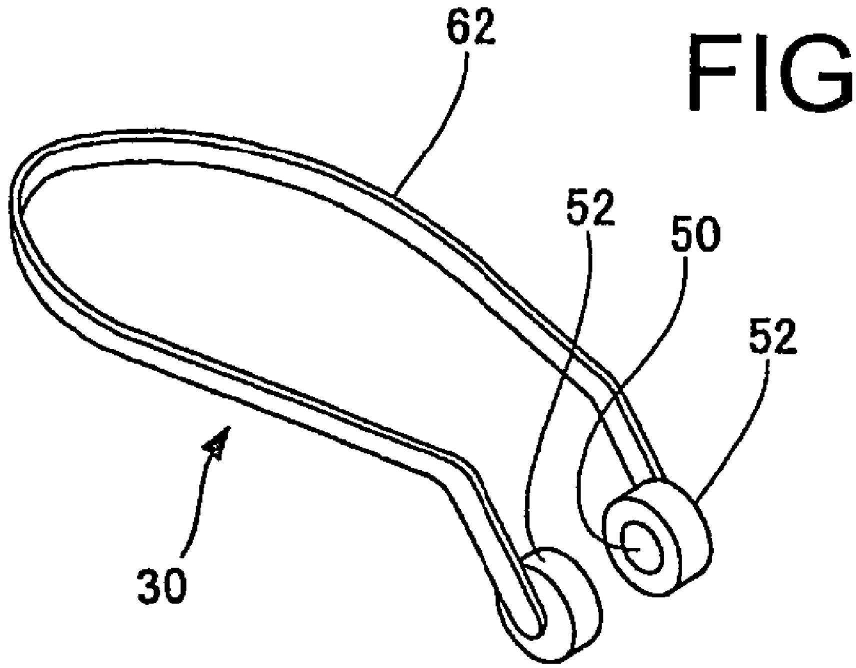
FIG. 5B is a perspective view of the vibrator holding structure according to the embodiment of the present invention.

The conventional structure of the vibration transferring unit may be used as the vibration transferring unit 30 according to the present invention. For example, as shown in FIG. 5B, the vibration transferring unit 30 has a vibrator 50 which transmits a vibration signal(s) as mechanical vibration outside the unit. At both sides of a hair band type attachment member (a spring type head band) 62 capable of elastic deformation, the vibrators 50 are disposed. It is possible to fix the vibrators 50 and 52 on a predetermined portion of the human body by putting the attachment member 62 on a head. That is, the vibrator 50 are fixed and in contact with human body surface at a predetermined portion.

Figure 2:
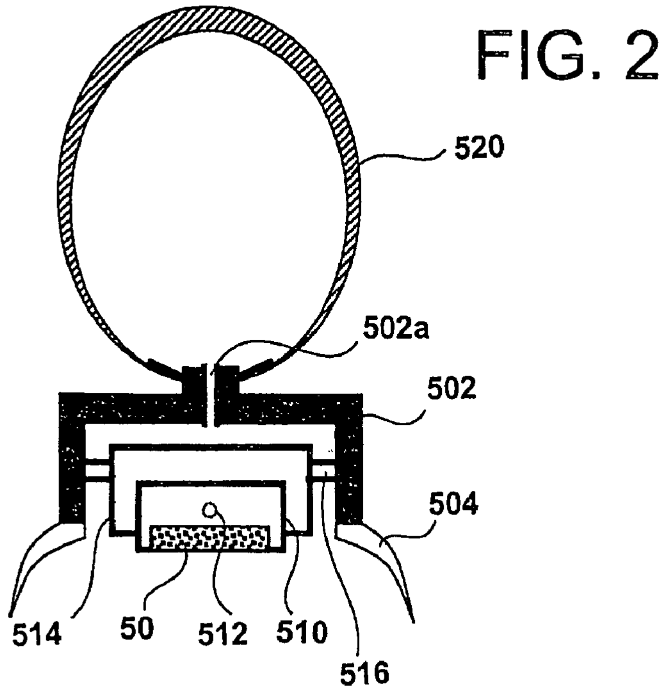
FIG. 2 is a cross-sectional view showing a vibration holding structure according to the embodiment of the present invention.
Figure 3:
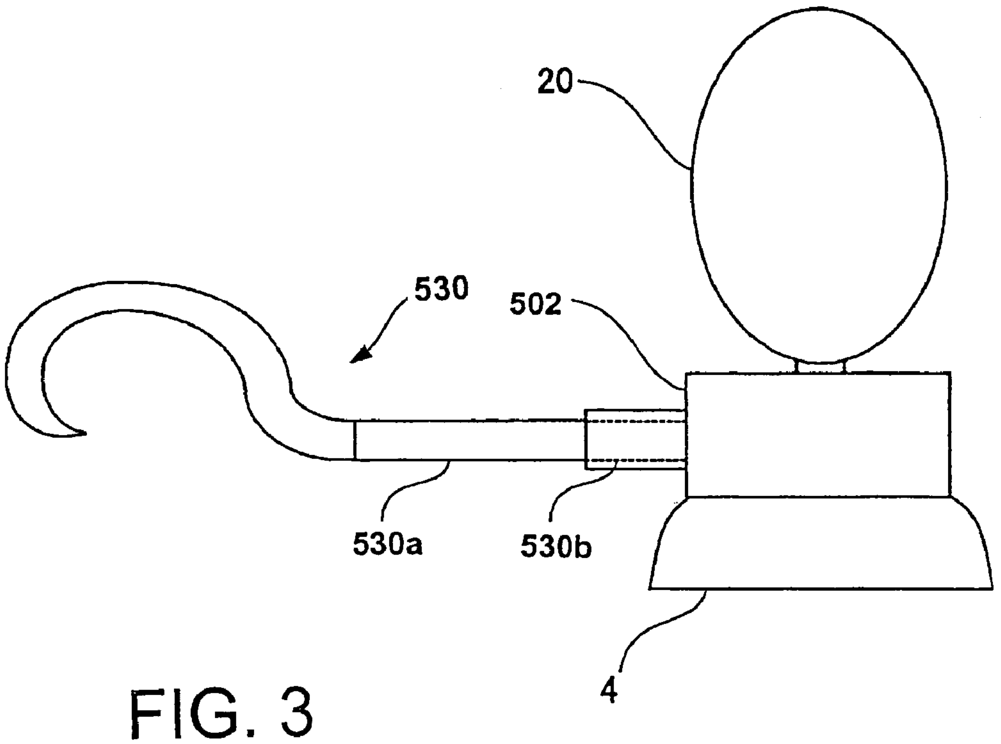
FIG. 3 is a side elevational view thereof.

According to the present invention, the vibration transmitter 30 may have a vibration holding structure shown in FIGS. 2 and 3 in order to accomplish stable transmission of audio information and good feeling of wearing, and also to solve the problems as to the cosmetic matters.

FIG. 2 is a cross-sectional view showing the vibrator holding structure according to an embodiment of the present invention.

In FIG. 2, a vibrator 50 is accommodated inside a cylindrical case 502, and a sucker-like member 504 is attached to an opening edge of the case 502. The vibrator 50 is swingably supported by the Gimbals mechanism with respect to two axes which are at right angles to each other. That is, the vibrator 50 is fixed to a first frame body 510 so that a vibration surface is exposed. The first frame body 510 is swingably supported through a first supporting axis 512 by a second frame body 514.

The second frame body 514 is swingably supported inside the case 502 through a second supporting axis 516 which is at right angle to the first supporting axis 512. The vibrating surface of the vibrator 50 is slightly projected from the opening of a case 502 and is structured so that, when the sucker-like member 504 is attached to a predetermined attachment part by absorption, the vibrating surface of the vibrator 50 contacts and pushes the adsorbed portion.

Moreover, a connecting hole 502*a* is formed in the center of a bottom portion (upper part of the figure) of the case 502, and a spherical pouched body 520 is connected to the connecting hole 502*a*. The pouched body 520 is made of elastic material, such as rubber material, and is capable of elastic deformation by pressing it. The inner space of the pouched body 520 is connected to the inner space of the case 502 through the connecting hole 502*a*.

According to such a vibrator holding structure, when the sucker-like member 504 is pressed against the predetermined attachment part of a human body while the pouched body 520 is held by hand, the vibrating surface of the vibrator 50 contacts the human body. Since the vibrator 50 is swingably supported by the Gimbals mechanism with respect to the two axes, even if the vibrator 50 is attached to an attachment part having a complicated 3-dimensional curved surface, it is possible to maintain the vibrator 50 in the posture which fits for the curved surface, and to contact the whole vibrating surface on the human body certainly. Then, if holding of the pouched body 520 by the hand is released, since the inner space of the case 502 will become negative pressure due to the shape restoring force of the pouched body 520 so that adsorption power is acquired, it is possible to certainly attach the vibrator 50 to the human body by the sucker-like member 504 and to certainly prevent displacement of the vibrator 50 with passage of time or changes of a posture.

Consequently, not only the good feeling of wearing is obtained, also the transmission accuracy of the audio information can be improved, and further, it is possible to attain power-saving by the improvement of transmission efficiency of vibrational energy.

Moreover, it is possible to attain miniaturization, and the head band for attaching the vibrator as in the prior art becomes unnecessary thereby solving the problem of appearance.

In case that vibrator 50 is removed, by holding the pouched body 520 by a hand, the negative pressure inside the case 502 drops and the sucker-like member 504 can be removed easily.

Although as these embodiments of the present invention are explained in detail above, for example, as shown in FIG. 3, when the vibrator 50 is attached to mastoid region, the attachment of the vibrator 50 can be ensured, without causing the problem of appearance, by attaching a hook-like engaging implement 530 to the external surface of the case 502, and hanging the engaging implement 530 behind an ear.

When the engaging implement 530 has an expanding and contracting portion 530*a* and a threaded portion 530*b* By having flexible section 530*a* which consists of rubber material, a spring and the like, and screw section 530*b* which screws together with the case 502, the engaging implement 530 is structured elastically and rotatably with respect to the case 502, thereby preventing differences among individuals from occurring with respect to the feeling of wearing and attachment stability.

Although not illustrated, an earphone type attachment portion inserted in an ear hole may be provided at the tip of the engaging implement 530.

Next, an operation of the audio information transmitting apparatus according to the present invention will be given below.

When audio is inputted from the outside while a switch of the audio information transmitting apparatus is turned on, after the audio is converted into an electrical signal(s) so as to generate an audio signal(s) and amplified it to a predetermined level, the amplified audio signal is outputted to the audio information recognizing unit 10.

The audio information recognizing unit 10 generates audio information comprising one or more syllables by analyzing the inputted audio signal, and outputs the generated audio information to the vibration signal generating unit 20.

Figure 4A:
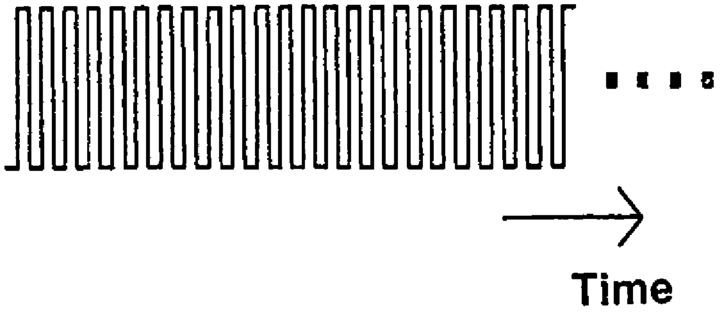
FIG. 4A is a timing chart showing a carrier signal.

In the vibration signal generating unit 20, the carrier signal generating unit 22 generates a carrier signal(s) which has constant amplitude and a frequency as shown in FIG. 4A.

In case that the vibration transferring unit 30 has a vibrator which contacts a human body as in the above embodiment, the frequency of the carrier signal may be preferably 20–100 kHz, and 20–50 kHz may be more desirable so that vibration is transmitted well to a cerebral hearing function through man's skin, muscles, or bone.

When the carrier signal generating unit 22 is equipped with a variable resistor(s) etc., it is desirable to be adjustable near the resonance frequency of vibrator.

The carrier signal modulation unit 24 extracts a pulse-like pattern corresponding to each syllable contained in audio information from the pattern storing unit 26 based on time series when audio information is inputted from the audio information recognizing unit 10.

Figure 4B:
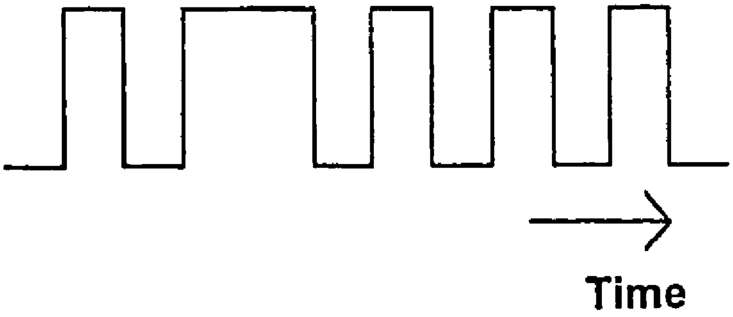
FIG. 4B is a timing chart showing a pulse-like pattern.

For example, the case where audio information is "o ha yo u", pulse-like patterns corresponding to syllables "o", "ha", "yo", and "u" are extracted one by one. These pulse-like patterns are defined according to a Morse Code. For example, a pulse pattern corresponding to the syllable "o" comprises a combination of predetermined short pulses and a long pause as shown in FIG. 4B.

Figure 4C:
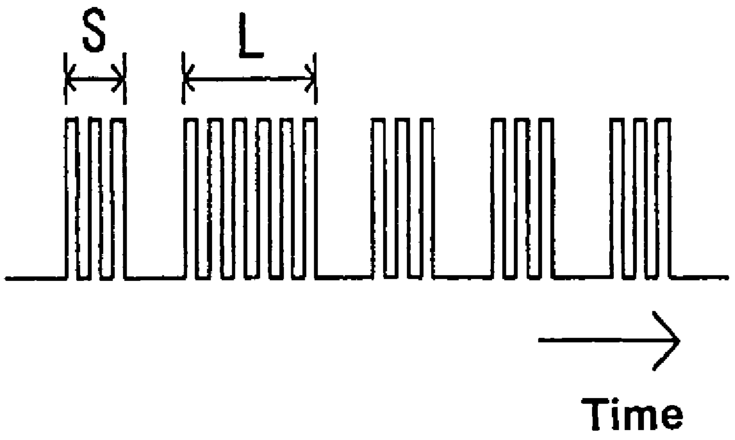
FIG. 4C is a timing chart showing an example of an oscillating signal.

After that, the carrier signal modulation unit 24 modulates a carrier signal based on the extracted pulse-like pattern, and outputs a vibration signals as shown in FIG. 4C. Although FIG. 4C shows the vibration signal corresponding to the pulse-like pattern of FIG. 4B, in order to make an understanding easy, the outline wave is shown, and the actual pulse width and pulse intervals are different from the actual ones. The pulse width of the short pulse S and the long pulse L, in FIG. 4C are preferably set, up according to the short tone and the long tone of Morse Code, respectively. In addition, the carrier signal modulation unit 24 controls not to output a vibration signal during the period when audio information is not inputted.

The vibration transferring section 30 vibrates one or more vibrators based on the inputted vibration signal. As a result, mechanical vibration corresponding to the inputted audio is transmitted to the human body.

Thus, since the audio information transmitting apparatus according to the present invention does not merely modulate amplitude and the frequency of the carrier signal as in the prior art, but modulates them based on a predetermined pulse like pattern corresponding to the recognized audio information thereby transmitting the audio information to a human body, it is possible to improve transmission efficiency by suitably choosing the vibration frequency and amplitude of the carrier signal.

Moreover, since the vibrational energy for transmitting audio information can be reduced with the improvement in transmission efficiency, it is possible to accomplish power-saving, and as a result it is possible to attain reduction in size and weight.

Although the embodiment of the present invention is explained in detail above, the concrete mode of this invention is not limited to the above-mentioned embodiments. For example, in the embodiments described above, although audio information comprises one or more syllables, it is also possible to generate audio information by collating with a phoneme pattern, a word pattern, etc. in the audio information recognizing unit 10, and relate the pulse like pattern stored in the pattern storing unit 26 to a predetermined phoneme or a predetermined word etc.

Moreover, in the above embodiments, although the pulse-like patterns stored in the pattern storing unit 26 are set up based on Morse Code, if various information can be distinguished by the structure of such a pulse-like pattern, it is not necessarily limited to the embodiments, and it is possible to use the pulse-like patterns whose number of pulses only is different.

Moreover, in the above embodiments, although the vibration transferring section 30 has the vibrator 32 which is fixed in the state where it is in contact with the human body surface, an earphone used for the conventional air conduction type hearing-aid capable of inserting into external acoustic meatus may be used. In this case, the frequency of the carrier signal which the carrier signal generating section 22 generates preferably preferably falls within an audible-sound region.

Also in such structure, since sound outputted from an earphone can be made into pure sound thereby carrying sound far, and it is possible to certainly and easily transmit audio information, and further attain energy-saving and size reduction.

According to the audio information transmitting apparatus of the present invention, it is possible to easily, certainly and stably transmit audio information to a user.

Further, according to the present invention, it is possible to provide audio information apparatus and a vibrator holding structure thereof capable of attaining good feeling of wearing and solving cosmetic problems.

The disclosure of Japanese Patent Application Nos. 2003-064595 filed on Mar. 11, 2003, and 2003-064615 filed on Mar. 11, 2003 including specification, drawings and claims is incorporated herein by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Further, the present invention possesses a number of advantages or purposes, and there is no requirement that every claim directed to that invention be limited to encompass all of them.

What is claimed is:

1. An audio information transmitting apparatus for transmitting audio information to a human body, comprising:

an audio signal generating unit in which an audio signal is generated based on inputted audio, an audio information recognizing unit in which the audio signal is recognized as audio information, a vibration signal generating unit in which a vibration signal is generated based on the audio information, a vibration transmitter for transmitting mechanical vibration based on the vibration signal, and a pattern storing unit that stores a predetermined pulse patterns, wherein the vibration signal generating unit modulates a carrier signal having a predetermined frequency based on the predetermined pulse pattern stored in the pattern storing unit corresponding to the audio information so as to generate the vibration signal.

2. The audio information transmitting apparatus according to claim 1, wherein the frequency of the carrier signal is 20 to 100 kHz.

3. The audio information transmitting apparatus according to claim 2, further including at least one vibrator capable of fixing on a predetermined surface portion of a human as the at least one vibrator is in contact with the predetermined surface.

4. The audio information transmitting apparatus according to claim 1, wherein the pulse pattern is set up based on Morse Code.

5. The audio information transmitting apparatus according to claim 2, wherein the pulse pattern is set up based on Morse Code.

6. The audio information transmitting apparatus according to claim 3, wherein the pulse pattern is set up based on Morse Code.

7. The audio information transmitting apparatus according to claim 1, wherein the vibration transmitter comprises a vibration for transmitting audio information to a human body, a case accommodating the vibrator, and a sucker member disposed on an opening of the case, wherein the vibrator is swingably supported by Gimbals mechanism with respect to two axes which are at right angle to each other in the case.

8. The audio information transmitting apparatus according to claim 2, wherein the vibration transmitter comprises a vibration for transmitting audio information to a human body, a case accommodating the vibrator, and a sucker member disposed on an opening of the case, wherein the vibrator is swingably supported by Gimbals mechanism with respect to two axes which are at right angle to each other in the case.

9. The audio information transmitting apparatus according to claim 3, wherein the vibration transmitter comprises a vibration for transmitting audio information to a human body, a case accommodating the vibrator, and a sucker member disposed on an opening of the case, wherein the vibrator is swingably supported by Gimbals mechanism with respect to two axes which are at right angle to each other in the case.

10. The audio information transmitting apparatus according to claim 4, wherein the vibration transmitter comprises a vibration for transmitting audio information to a human body, a case accommodating the vibrator, and a sucker member disposed on an opening of the case, wherein the vibrator is swingably supported by Gimbals mechanism with respect to two axes which are at right angle to each other in the case.

11. The audio information transmitting apparatus according to claim 7, wherein a connecting hole is provided on a bottom portion of the case, a pouched body capable of elastic deformation is disposed on the case so as to connect an inner space of the pouched body to the connecting hole.

12. The audio information transmitting apparatus according to claim 7, further including a hook engaging member disposed elastically and rotatably on the case.

13. The audio information transmitting apparatus according to claim 11, further including a hook engaging member disposed elastically and rotatably on the case.

14. A method for transmitting audio information to a human body, comprising the following steps of:

generating an audio signal based on inputted audio, recognizing the audio signal as audio information, generating a vibration signal based on the audio information, wherein a carrier signal having a predetermined frequency is modulated based on a predetermined pulse pattern stored in a pattern storing unit corresponding the audio signal, and transmitting mechanical vibration based on the vibration signal.

* * * * *